US00RE48148E

(19) United States
(12) Reissued Patent
Wang et al.

(10) Patent Number: US RE48,148 E
(45) Date of Reissued Patent: Aug. 11, 2020

(54) SUPPORTING MECHANISM AND CRIB THEREWITH

(71) Applicant: WONDERLAND SWITZERLAND AG, Steinhausen (CH)

(72) Inventors: HongGuang Wang, Guangdong (CN); Wen-Qu Hu, Guangdong (CN); Chin-Ming Cheng, Taipei (TW)

(73) Assignee: WONDERLAND SWITZERLAND AG, Steinhausen (CH)

(21) Appl. No.: 15/963,624

(22) Filed: Apr. 26, 2018

Related U.S. Patent Documents

Reissue of:
(64) Patent No.: 9,345,339
Issued: May 24, 2016
Appl. No.: 14/106,843
Filed: Dec. 15, 2013

(30) Foreign Application Priority Data

Dec. 17, 2012 (CN) ..... 2012 1 0548767
Sep. 26, 2013 (CN) ..... 2013 1 0445589

(51) Int. Cl.
*A47D 7/04* (2006.01)
*A47D 9/00* (2006.01)
*A47D 13/06* (2006.01)

(52) U.S. Cl.
CPC ..... *A47D 7/04* (2013.01); *A47D 9/005* (2013.01); *A47D 13/063* (2013.01)

(58) Field of Classification Search
CPC ..... A47D 9/005; A47D 7/04; A47D 13/063
See application file for complete search history.

(56) References Cited

U.S. PATENT DOCUMENTS 3,848,277 A 11/1974 Reguitti
5,615,427 A 4/1997 Huang
5,694,655 A * 12/1997 Shepler ..... A47D 9/02 5/101
5,898,960 A 5/1999 Hill
(Continued)

FOREIGN PATENT DOCUMENTS

DE 196 17 363 C1 9/1997
GB 01268 0/1911
(Continued)

*Primary Examiner* — Terrence R Till
(74) *Attorney, Agent, or Firm* — Finnegan, Henderson, Farabow, Garrett & Dunner, LLP

(57) ABSTRACT

The present invention is to provide a supporting mechanism disposed on a hammock for supporting a mattress, and the supporting mechanism includes a folding component and a plurality of supporting components. The folding component is disposed on a central position of the hammock, and the folding component includes an upper surface, a lower surface and an avoiding section passing through the upper surface and the lower surface. The plurality of supporting components is disposed around the folding component and for supporting the mattress. An end of each of the plurality of supporting components is pivotally connected to the folding component, and the other end of each supporting component is fixed on an edge position of the hammock. The operation of the supporting mechanism is easy so that the hammock and the bedstead can be folded or unfolded together. Accordingly, the present invention is to provide a crib therewith.

57 Claims, 8 Drawing Sheets

(56) References Cited

U.S. PATENT DOCUMENTS

| | | | | |
|---|---|---|---|---|
| 6,131,218 | A * | 10/2000 | Wang | A47D 13/06 5/93.1 |
| 6,313,218 | B1 | 11/2001 | Fiori et al. | |
| 6,434,767 | B1 * | 8/2002 | Welsh, Jr. | A47D 7/04 5/93.2 |
| 7,770,245 | B2 * | 8/2010 | Cheng | A47D 7/04 5/655 |
| 8,566,988 | B2 * | 10/2013 | Son | A47D 7/04 5/690 |
| 9,113,723 | B2 * | 8/2015 | Greger | A47D 9/00 |
| 2002/0092094 | A1 * | 7/2002 | Welsh, Jr. | A47D 7/04 5/95 |
| 2009/0025148 | A1 * | 1/2009 | Cheng | A47D 13/063 5/655 |
| 2011/0283457 | A1 * | 11/2011 | Son | A47D 9/00 5/690 |
| 2012/0233770 | A1 * | 9/2012 | Greger | A47D 9/00 5/98.1 |
| 2013/0117930 | A1 * | 5/2013 | Hsu | A47D 13/063 5/93.1 |
| 2014/0068856 | A1 * | 3/2014 | Thomson | A47D 7/00 5/93.1 |
| 2014/0165288 | A1 * | 6/2014 | Wang | A47D 9/005 5/99.1 |
| 2014/0208505 | A1 * | 7/2014 | Burkholder | A47D 13/063 5/99.1 |

FOREIGN PATENT DOCUMENTS

| | | |
|---|---|---|
| GB | 01268 | 7/1911 |
| GB | 2465596 A | 5/2010 |

* cited by examiner

SUPPORTING MECHANISM AND CRIB THEREWITH

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This is a reissue of U.S. Pat. No. 9,345,339, issued on May 24, 2016, from U.S. patent application Ser. No. 14/106,843, which is based upon and claims the benefit of priority from Chinese Patent Application No. 201210548767.9, filed Dec. 17, 2012, and from Chinese Patent Application No. 201310445589.1, filed Sep. 26, 2013. The entire contents of the above-identified applications are incorporated herein by reference.*

BACKGROUND OF THE INVENTION

1. Field of the Invention

The present invention relates to and a supporting mechanism and a crib therewith, and more specifically, to a supporting mechanism for supporting a hammock of a crib and the crib therewith.

2. Description of the Prior Art

An internal space of a crib is too deep to care a baby conveniently, Thus, the conventional crib includes a hammock connected with a bedstead of the crib for hanging the baby on the hammock. The hammock is installed on an upper side of the bedstead for providing the baby a playing space and for a carer to conveniently hold the baby out of the crib or put the baby in the crib. Meanwhile, a supporting mechanism is disposed on a bottom of the conventional crib so as to fold the crib for storage.

However, a supporting bracket is often disposed under a mattress on the hammock preventing the mattress from bending so as to support the baby stably. Therefore, the conventional supporting mechanism is often designed as a fixed structure. As folding the crib, the hammock has to be detached from the bedstead of the crib first, and then the folding mechanism can be operated to fold the crib. But, this folding operation is inconvenient for the carer. Therefore, it is necessary to providing a supporting mechanism capable of folding or unfolding the hammock together with the bedstead with an easy operation.

SUMMARY OF HE INVENTION

The present invention is to provide a supporting mechanism capable of folding or unfolding a hammock together with a bedstead with an easy operation, and a crib therewith.

The present invention is to provide the supporting mechanism disposed on the hammock for supporting a mattress, the supporting mechanism includes a folding component and a plurality of supporting components. The folding component is disposed on a central position of the hammock, and the folding component includes an upper surface, a lower surface and an avoiding section passing through the upper surface and the lower surface. The plurality of supporting components is disposed around the folding component and for supporting a mattress. An end of each of the plurality of supporting components is pivotally connected to the folding component, and the other end of each of the plurality of supporting components is fixed on an edge position of the hammock.

Preferably, an avoiding section is a first through hole disposed on a central position of the folding component.

Preferably, a folding component includes an annular structure and a resilient structure, the avoiding section is enclosed by the annular structure, the annular structure includes an opening communicated to the avoiding section, and the resilient structure is disposed in the opening for enlarging or shrinking the avoiding section. An operator can pull two sides of the annular structure in opposite directions so that the resilient structure is stretched for enlarging the first through hole, and then the operator can insert a hand into the first through hole to operate the folding mechanism.

Preferably, the resilient structure is a spring.

Preferably, the avoiding section is a concave disposed on a lateral position of the folding component.

Preferably, the folding component is sewed on the hammock. As the folding component is sewed on the hammock, the folding component can be fixed on the hammock and drives a bed bottom to move so as to fold or unfold the supporting mechanism and the hammock easily.

Preferably, the folding component includes a base and a pivoting portion connected to the base and pivoted to the plurality of supporting components.

Preferably, the plurality of supporting components is arranged radially around the folding component. As the plurality of supporting components is arranged radially around the folding component, the supporting mechanism can support the mattress in balance and stably.

Preferably, the supporting component includes a retracting structure, the supporting mechanism is expanded as the retracting structure is stretched, and the supporting mechanism is folded as the retracting structure is retracted so as to reduce a size of the supporting mechanism for easy storage.

Accordingly, the present invention provides a crib including a bedstead, a folding mechanism, a hammock, a mattress and a supporting mechanism. The folding mechanism is disposed on a bottom of the bedstead, the hammock is installed on the bedstead, the mattress is disposed on the hammock, and the supporting mechanism is disposed on the hammock for supporting the mattress. The hammock includes a bed bottom 10 and a bed bumper. The supporting mechanism includes a folding component and a plurality of supporting components. The folding component is disposed on a central position of the hammock, and the plurality of supporting components is disposed around the folding component and for supporting the mattress. The folding component includes an upper surface, a lower surface and an avoiding section passing through the upper surface and the lower surface. An end of each of the plurality of supporting components is pivotally connected to the folding component, and the other end of each of the plurality of supporting components is fixed on an edge position of the hammock.

Preferably, the hammock includes a bed bottom and a bed bumper connected to edges of the bed bottom, and the bed bottom includes a second through hole corresponding to the folding mechanism, The operator can stretch out a hand into the second hole to reach the folding mechanism instead of operating the folding mechanism across the bed bottom, to make the folding operation much easier.

In the present application, the supporting mechanism is disposed on the hammock so that the hammock and the bedstead can be folded or unfolded together without detaching the hammock from the bedstead, resulting in an easy operation. Besides, the avoiding section is disposed on the folding component of the supporting mechanism and passes through the upper surface and the lower surface. The operator can insert the hand into the avoiding section and pass through the supporting mechanism for operating the folding mechanism disposed on the bottom of the crib easily without detaching the hammock from the crib. As the end of the supporting component is pivoted to the folding component, the operator can just operate the folding mechanism to fold the crib upwardly, and the supporting component pivots downwardly relative to the folding component, so that the supporting mechanism can be folded with the folding operation of the crib so as to fold or unfold the hammock and the bedstead together. Because the other end of the supporting component is fixed on the hammock, the supporting component cannot be missed as installing the crib so as to enhance the safety of the hammock.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
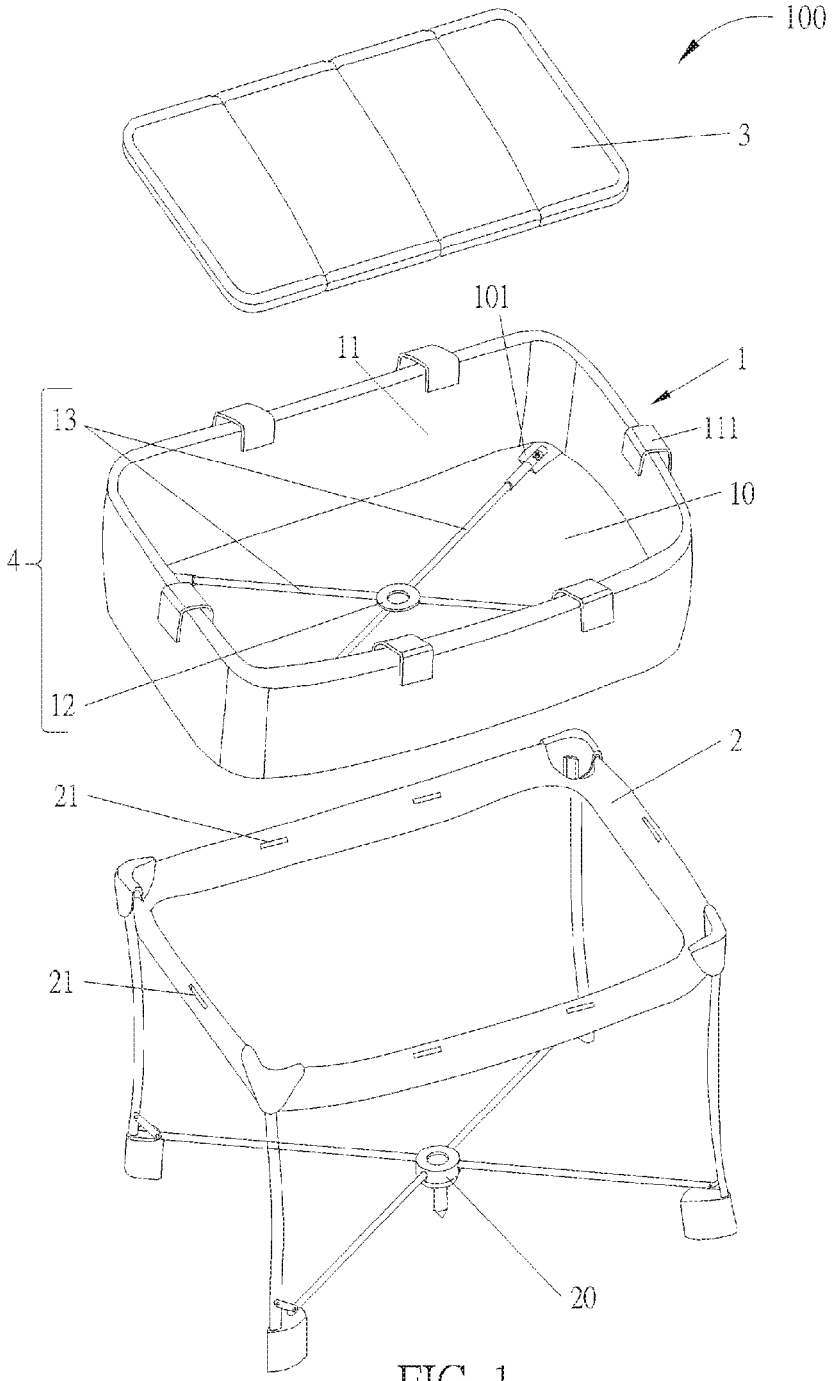
FIG. 1 is an exploded diagram of a crib according to a first embodiment of the present invention.

Please refer to FIG. 1. FIG. 1 is an exploded diagram of a crib 100 according to a first embodiment of the present invention. The crib 100 includes a hammock 1. a bedstead 2, a folding mechanism 20, a mattress 3 and a supporting mechanism 4. The folding mechanism 20 is disposed on a bottom of the bedstead 2, the hammock 1 is installed on the bedstead 2, the mattress 3 is disposed on the hammock 1, and the supporting mechanism 4 is disposed on the hammock 1 for supporting the mattress 3. The hammock 1 includes a bed bottom 10 and a bed bumper 11. The supporting mechanism 4 includes a folding component 12 and a plurality of supporting components 13. The folding component 12 is disposed on a central position of the hammock 1, and the plurality of supporting components 13 is disposed around the folding component 12 and for supporting the mattress 3. The folding component 12 includes an upper surface, a lower surface and an avoiding section passing through the upper surface and the lower surface. An end of each of the plurality of supporting components 13 is pivotally connected to the folding component 12, and the other end of each of the plurality of supporting components 13 is fixed on an edge position of the hammock 1.

Specifically, the folding component 12 and the plurality of the supporting components 13 are disposed on the bed bottom 10, and the folding component 12 is disposed on a central position of the bed bottom 10. The other end of each of the plurality of supporting components 13 is fixed on an edge position of the bed bottom 10 away from the central position, that is, a corner position.

Figure 2:
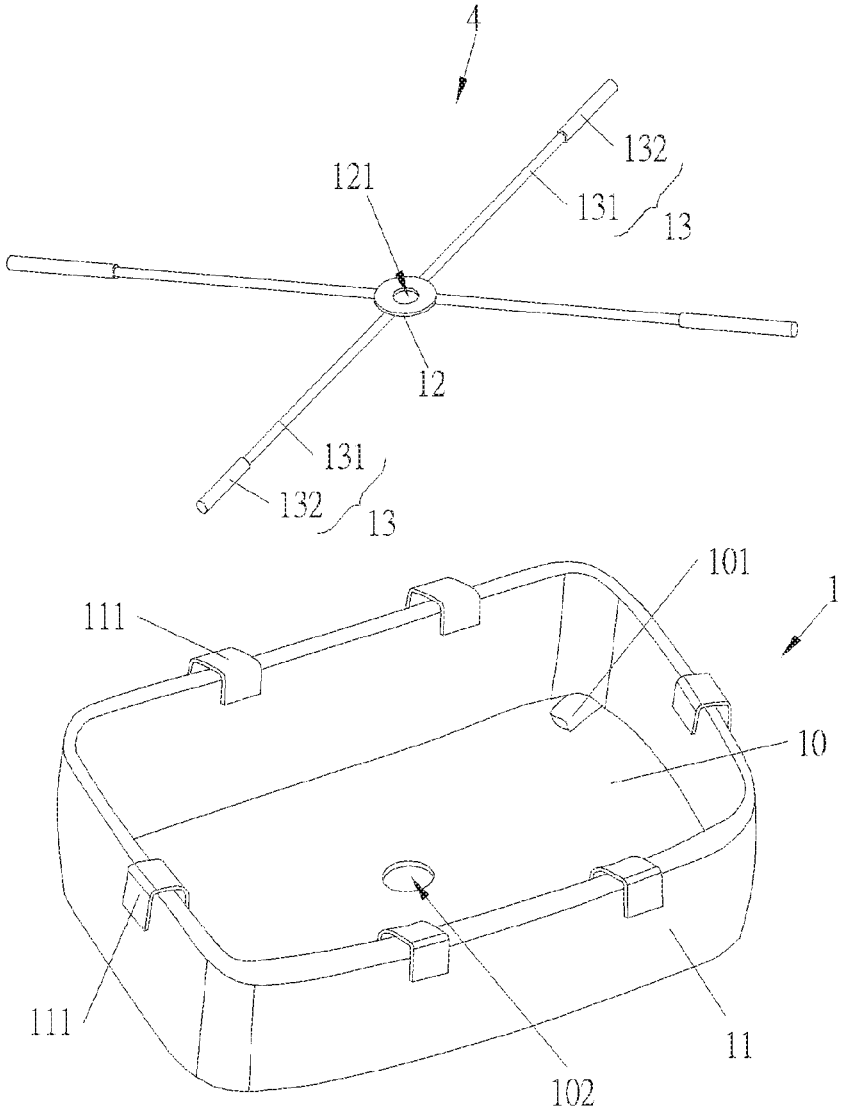
FIG. 2 is an exploded diagram of a hammock and a supporting mechanism according to the first embodiment of the present invention.

Please refer to FIG. 1 and FIG. 2. FIG. 2 is an exploded diagram of the hammock 1 and the supporting mechanism 4 according to the first embodiment of the present invention. Edges of the bed bottom 10 are fixed to a lower position of the bed bumper 11. A second through hole 102 is disposed on the central position of the bed bottom 10 corresponding to the avoiding section. Pockets 101 are disposed on four corners of the bed bottom 10 whereinto the plurality of supporting components 13 is inserted. Six buckles 111 are disposed on the bed bumper 11. The buckles 111 are engaged with corresponding slots 21 disposed on the bedstead 2 for installing the hammock 1 on the bedstead 2.

Figure 3:
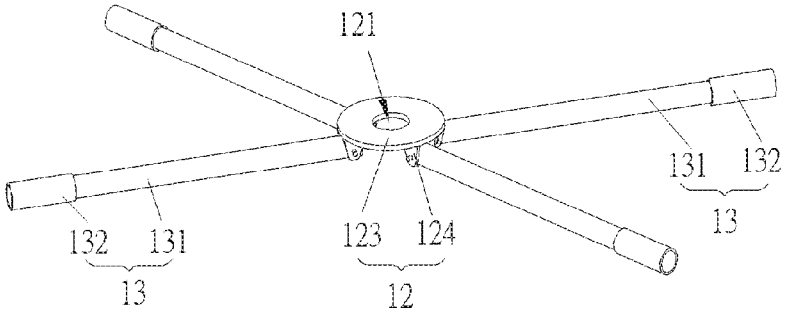
FIG. 3 is a schematic diagram of the supporting mechanism according to the first embodiment of the present invention.
Figure 4:
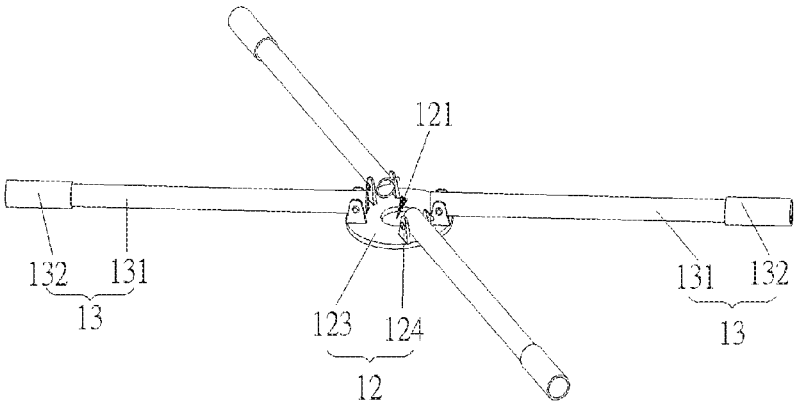
FIG. 4 is a diagram of the supporting mechanism in a different view according to the first embodiment of the present invention.

Please refer to FIG. 3 and FIG. 4. FIG. 3 is a schematic diagram of the supporting mechanism 4 according to the first embodiment of the present invention. FIG. 4 is a diagram of the supporting mechanism 4 in a different view according to the first embodiment of the present invention. Specifically, the folding component 12 includes a base 123 and a pivoting portion 124 connected to the base 123. The base 123 can be an annular structure and can be sewed on the bed bottom 10. The avoiding section is a first through hole 121 disposed on a central position of the base 123. The first through hole 121 passes through the upper surface and the lower surface of the folding component 12 and is located in a position corresponding to the second through hole 102.

In this embodiment, the supporting mechanism 4 includes four supporting components 13, but not limited to this. The four supporting components 13 are arranged radially around the folding component 12 and extending from the folding component 12 to the bed bumper 11. The supporting component 13 includes a retracting structure. The supporting mechanism 4 is expanded as the retracting structure is stretched. The supporting mechanism 4 is folded as the retracting structure is retracted. Specifically, each supporting component 13 includes a first supporting portion 131 and a second supporting portion 132. An end of the second supporting portion 132 is hollow, and an end of the first supporting portion 131 is slidably inserted into the end of the second supporting portion 132 so as to form the retracting structure of the supporting mechanism 4. The other end of the first supporting portion 131 is pivoted to the folding component 12, and a pivoting axis is parallel to the upper surface of the folding component 12. The other end of the second supporting portion 132 is inserted to the corresponding pocket 101 and fixed with the corresponding pocket 101.

Figure 5:
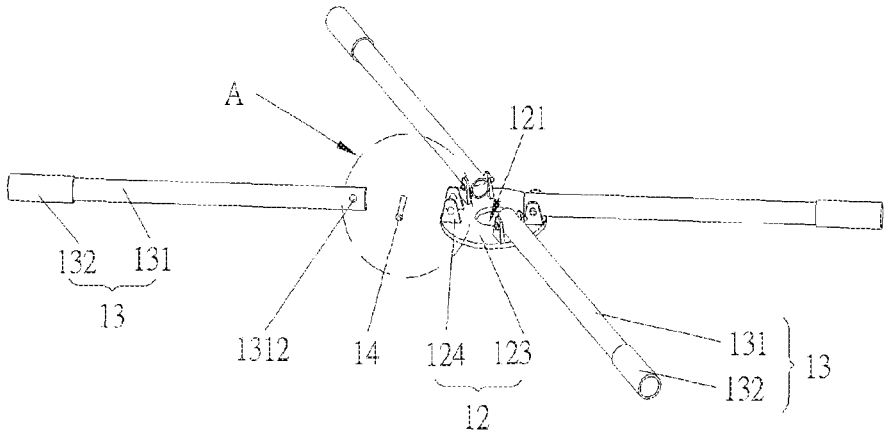
FIG. 5 is a partial exploded diagram of the supporting mechanism according to the first embodiment of the present invention.
Figure 6:
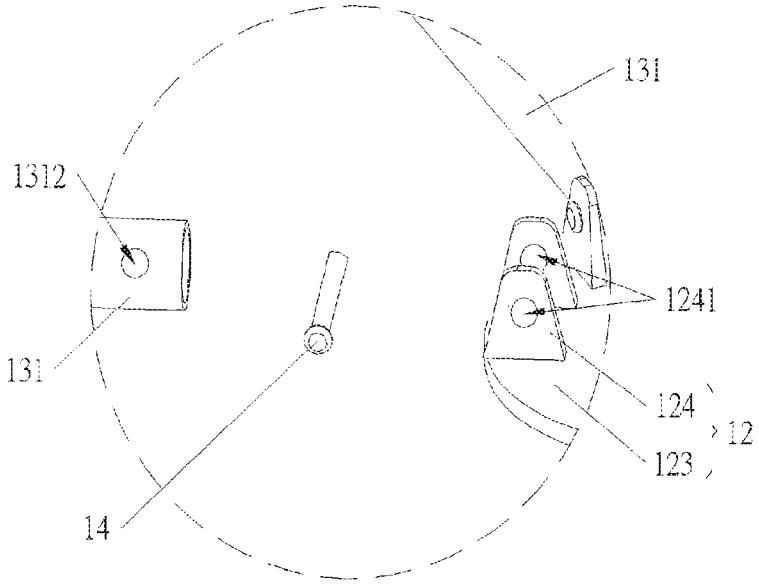
FIG. 6 is an enlarged diagram of area A in FIG. 5 according to the first embodiment of the present invention.

Specifically, please refer to FIG. 5 and FIG. 6. FIG. 5 is a partial exploded diagram of the supporting mechanism 4 according to the first embodiment of the present invention.

Figure 8:
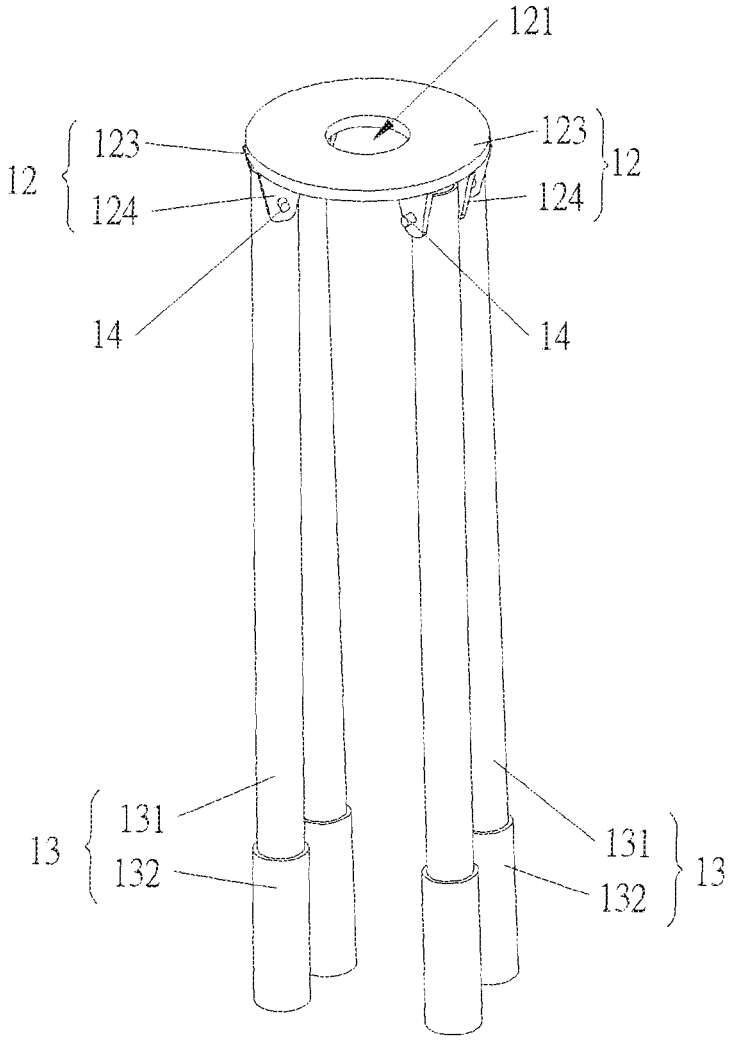
FIG. 8 is a diagram of the supporting mechanism being folded according to the first embodiment of the present invention.

FIG. 6 is an enlarged diagram of area A in FIG. 5 according to the first embodiment of the present invention. A first pivoting hole 1241 is disposed on the pivoting portion 124. A second pivoting hole 1312 is disposed on the other end of the first supporting portion 131. The hammock 1 has a plurality of pivoting components 14. Each of the plurality of pivoting components 14 passes through the first pivoting hole 1241 and the second pivoting hole 1312 so as to pivotally connect the second supporting portion 132 to the pivoting portion 124. The pivoting component 14 is disposed parallel to the upper surface of the folding component 12. Please refer to FIG. 8. FIG. 8 is a diagram of the supporting mechanism 4 being folded according to the first embodiment of the present invention. As operating the folding mechanism 20 for folding the bedstead 2 upward, the four supporting components 13 pivot downward relative to the folding component 12 so as to fold or unfold the hammock 1 together with the bedstead 2.

Figure 7:
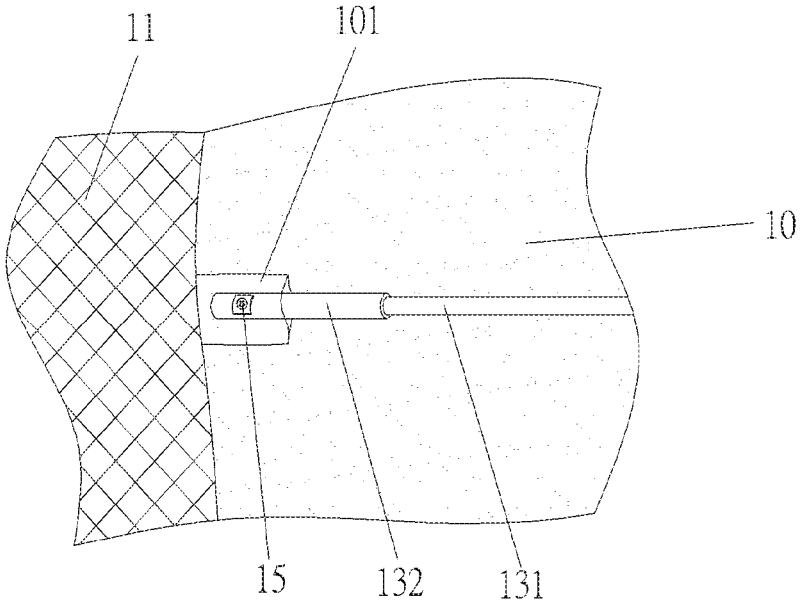
FIG. 7 is a diagram of a supporting component being connected to the bed bottom according to the first embodiment of the present invention.

Please refer to FIG. 7. FIG. 7 is a diagram of the supporting components 13 being connected to the bed bottom 10 according to the first embodiment of the present invention. The other end of the second supporting portion 132 is inserted into the pocket 101. The hammock 1 further includes a plurality of fixing components 15. Each of the plurality of fixing components 15 passes through the pocket 101 and the second supporting portion 132 for fixing the second supporting portion 132 on the bed bottom 10. As the second supporting portion 132 is fixed on the bed bottom 10, the operator could not miss installing the supporting component 13 when assembling the hammock 1, so as to enhance the safety of the hammock 1.

Figure 9:
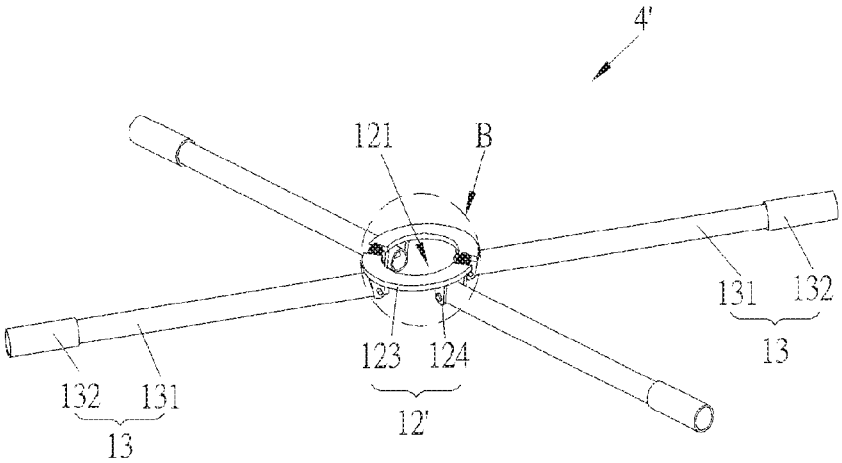
FIG. 9 is a diagram of the supporting mechanism according to a second embodiment of the present invention.
Figure 10:
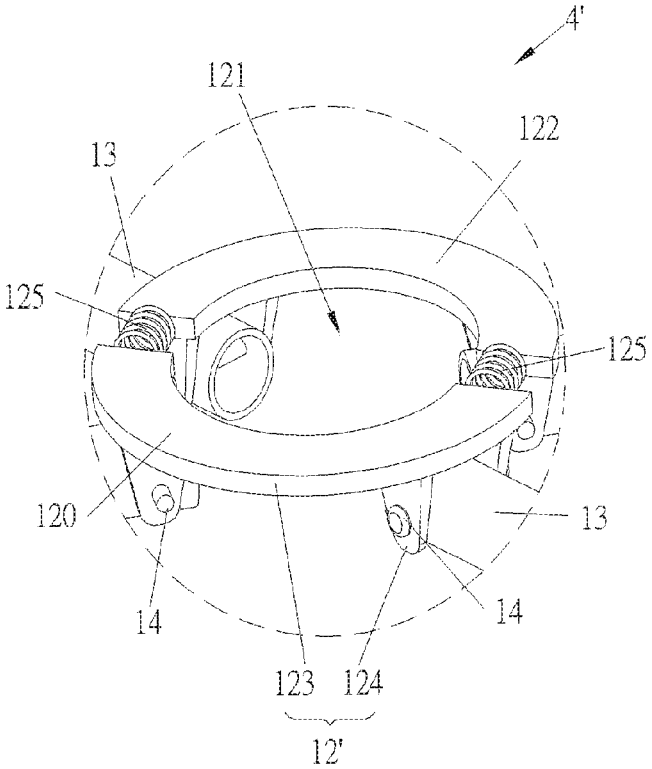
FIG. 10 is an enlarged diagram of area B in FIG. 9 according to the second embodiment of the present invention.

Please refer to FIG. 9 and FIG. 10. FIG. 9 is a diagram of the supporting mechanism 4' according to a second embodiment of the present invention. FIG. 10 is an enlarged diagram of area B in FIG. 9 according to the second embodiment of the present invention. The bed bottom 10 and the bed bumper 11 of the hammock 1, and the supporting component 13 in this embodiment and in the first embodiment are the same. A folding component 12' including an annular structure and a resilient structure in the second embodiment is different from the folding component 12 in the first embodiment. The annular structure is enclosed to form the avoiding section, that is, the first through hole 121, and includes openings communicated to the avoiding section. The resilient structure is disposed in the opening for enlarging or shrinking the avoiding section. Specifically, the annular structure includes a first folding component 120 and a second folding component 122, which are in a semicircular shape. The resilient structure includes two resilient connecting components 125. Two ends of each resilient connecting component 125 are fixed on the first folding component 120 and the second component 122 respectively. The openings are formed between two ends of the first folding component 120 and two ends of the second folding component 122 for accommodating the resilient connecting components 125. Specifically, the resilient connecting component 125 is fixed between the first folding component 120 and the second folding component 122 and installed in the opening. The resilient connecting component 125 can be a spring or another elastic component. The first folding component 120, the second component 122 and the two resilient connecting components 125 are enclosed to form the first through hole 121. The first folding component 120 and the second folding component 122 move away from each other for stretching the resilient connecting component 125 for operating the folding mechanism 20. Meanwhile, the first through hole is enlarged so that the operator can insert the hand into the first through hole 121 so as to operate conveniently.

Figure 11:
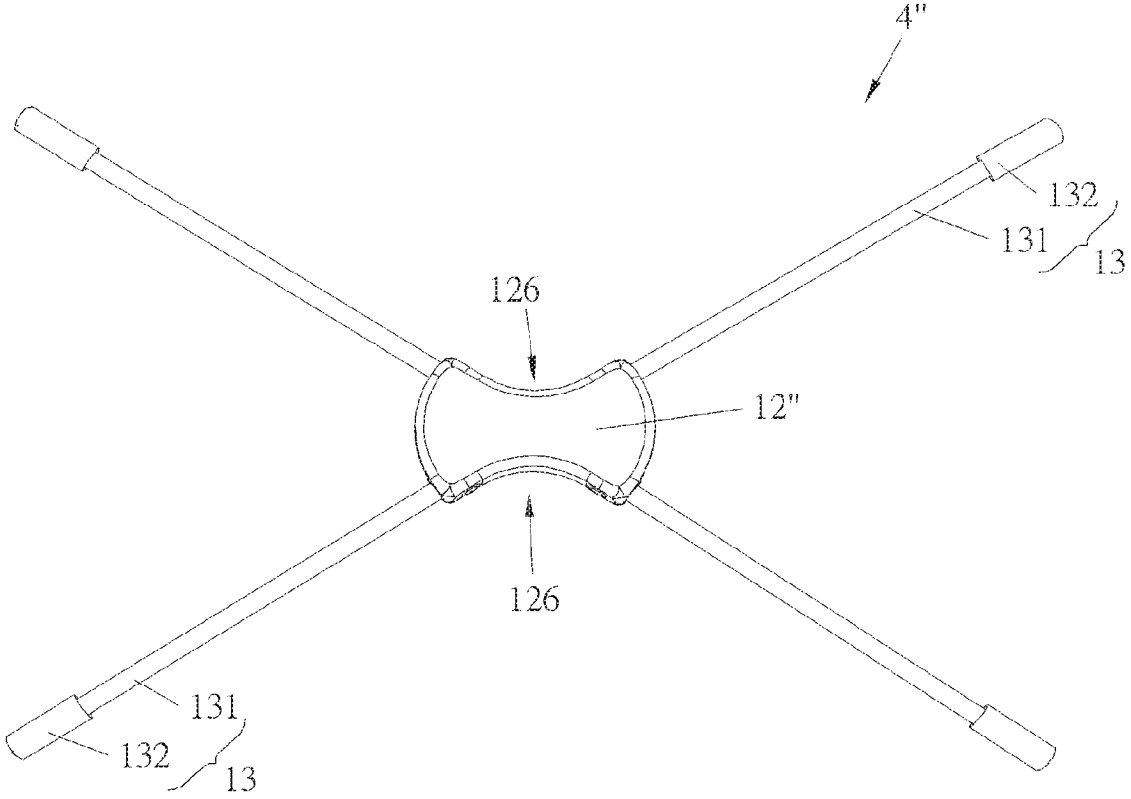
FIG. 11 is a diagram of the supporting mechanism according to a third embodiment of the present invention.

Please refer to FIG. 11. FIG. 11 is a diagram of the supporting mechanism 4" according to a third embodiment of the present invention. A folding component 12" in the third embodiment is different form the folding component 12 in the first embodiment. The folding component 12" is in a rectangular shape and has two opposite arc-shaped short sides. For example, the two short sides can be formed in a biconcave shape. Avoiding sections are concaves 126 disposed on two opposite long sides of the folding component 12". The operator can use the hand for bypassing the folding component 12" through anyone of the two concaves 126 so as to operate the folding mechanism 20. Without opening a through hole in the central position of the folding component 12 for passing thorough the hand, the folding component 12" can be smaller and stronger, and thus the folded hammock 1 can be smaller has an advantage in storage.

In contrast to the prior art, the avoiding section is formed on the folding component 12 of the supporting mechanism 4, and the second though hole 102 is disposed in the central position of the bed bottom 10 corresponding to the avoiding section. Therefore, the operator can easily insert the hand into the avoiding section and the second though hole 102 to operate the folding mechanism 20 without detaching the hammock 1 from the bedstead 3. The pivoting portion 124 is disposed on the folding component 12, the pivoting portion 124 includes the first pivoting hole 1241, the second pivoting hole 1312 is disposed on the first supporting portion 131, and the pivoting component 14 passes through the first pivoting hole 1241 and the second pivoting hole 1312 so as to pivotally connect the supporting component 13 to the folding component 12. Therefore, as operating the folding mechanism 20 for folding the bedstead 2 upwardly, the four supporting component 13 pivot downward relative to the folding component 12 so as to fold or unfold the hammock 1 together with the bedstead 2. Besides, the first supporting component 131 is slidably inserted into the second supporting component 132. When the hammock 1 and the bedstead 2 are folded together, a part of the first supporting component 131 slides into the second supporting component 132 so as to shorten a total length of the supporting component 13, so that the crib 100 can be folded in a small size for easy storage.

Those skilled in the art will readily observe that numerous modifications and alterations of the device and method may be made while retaining the teachings of the invention. Accordingly, the above disclosure should be construed as limited only by the metes and bounds of the appended claims.

What is clammed is:

1. A supporting mechanism disposed on a hammock for supporting a mattress, the supporting mechanism comprising:

a folding component disposed on a central position of the hammock, the folding component comprising an upper surface, a lower surface and an avoiding section passing through the upper surface and the lower surface, a through hole formed on the hammock and corresponding to the avoiding section wherethrough a hand is capable of being inserted to operate the folding component; and a plurality of supporting components disposed around the folding component and for supporting the mattress, an end of each of the plurality of supporting components being pivotally connected to the folding component, and the other end of each of the plurality of supporting components being fixed on an edge position of the hammock.

2. The supporting mechanism of claim 1, wherein the avoiding section is [a] another through hole disposed on a central position of the folding component.

3. The supporting mechanism of claim 1, wherein the folding component comprises an annular structure and a resilient structure, the avoiding section is enclosed by the annular structure, the annular structure comprises an opening communicated to the avoiding section, and the resilient structure is disposed in the opening for enlarging or shrinking the avoiding section.

4. The supporting mechanism of claim 3, wherein the resilient structure is a spring.

5. The supporting mechanism of claim 1, wherein the avoiding section is a concave disposed on a lateral position of the folding component.

6. The supporting mechanism of claim 1, wherein the folding component is sewed on the hammock.

7. The supporting mechanism of claim 1, wherein the folding component comprises a base and a pivoting portion [connected to the base and pivoted to the plurality of supporting components] *wherein the pivoting portion is pivotally connected to the plurality of supporting components*.

8. The supporting mechanism of claim 1, wherein the plurality of supporting components is arranged radially around the folding component.

9. The supporting mechanism of claim 1, wherein each supporting component comprises a retracting structure, the supporting mechanism is expanded as the retracting structure is stretched, and the supporting mechanism is folded as the retracting structure is retracted.

10. A crib comprising:

a bedstead;

a folding mechanism disposed on a bottom of the bedstead;

a hammock installed on the bedstead;

a mattress disposed on the hammock; and a supporting mechanism disposed on the hammock for supporting the mattress, the supporting mechanism comprising:

a folding component disposed on a central position of the hammock, the folding component comprising an upper surface, a lower surface and an avoiding section passing through the upper surface and the lower surface; and a plurality of supporting components disposed around the folding component and for supporting the mattress, an end of each of the plurality of supporting components being pivotally connected to the folding component, and the other end of each of the plurality of supporting components being fixed on an edge position of the hammock.

11. The crib of claim 10, wherein the avoiding section is a first through hole disposed on a central position of the folding component.

12. The crib of claim 10, wherein the folding component comprises an annular structure and a resilient structure, the avoiding section is enclosed by the annular structure, the annular structure comprises an opening communicated to the avoiding section, and the resilient structure is disposed in the opening for enlarging or shrinking the avoiding section.

13. The crib of claim 12, wherein the resilient structure is a spring.

14. The crib of claim 10, wherein the avoiding section is a concave disposed on a lateral position of the folding component.

15. The crib of claim 10, wherein the hammock comprises a bed bottom and a bed bumper connected to edges of the bed bottom, and the bed bottom comprises another through hole corresponding to the [folding mechanism] *avoiding section*.

16. The crib of claim 10, wherein the plurality of supporting components is arranged radially around the folding component.

17. The crib of claim 10, wherein each supporting component comprises a retracting structure, the supporting mechanism is expanded as the retracting structure is stretched, and the supporting mechanism is folded as the retracting structure is retracted.

*18. A crib comprising:*

*a bedstead;*

*a hammock including a bottom portion and a side portion, the side portion being arranged to be coupled to the bedstead; and*

*a plurality of supporting components disposed near the bottom portion of the hammock, wherein at least one supporting component having a first end being movable relative to a first end of one or more other supporting components and a second end of the at least one supporting component being fixed to an edge position of the bottom portion of the hammock,*

*wherein the plurality of supporting components are configured in a first position when the hammock is folded and a second position when the hammock is unfolded, without removing the hammock from the crib.*

*19. The crib of claim 18, wherein the bottom portion includes pockets arranged to receive the supporting components.*

*20. The crib of claim 18, wherein the hammock includes a plurality of fixing components arranged to fix the supporting components to the bottom portion.*

*21. The crib of claim 20, wherein the bottom portion includes pockets arranged to receive the supporting components, each fixing component being arranged to pass through a respective pocket and a respective corresponding supporting component inserted into the respective pocket.*

*22. The crib of claim 18, wherein each of the supporting components includes a retracting structure, the hammock being arranged to expand as the retracting structure is stretched, and the hammock being arranged to fold as the retracting structure is retracted.*

*23. The crib of claim 18, wherein at least one of the supporting components includes a first supporting portion and a second supporting portion, a first end of the first supporting portion being arranged to be slidably inserted into a first end of the second supporting portion, a second end of the first supporting portion being movable relative to a second end of the first supporting portion of another supporting component, and a second end of the second supporting portion being fixed to the bottom portion.*

*24. The crib of claim 18, further comprising:*

*a mattress disposed on the bottom portion of the hammock,*

*wherein the supporting components are arranged to support the mattress.*

*25. The crib of claim 18, further comprising:*

*a folding component movably connected to the first ends of the supporting components.*

*26. The crib of claim 25, wherein the folding component includes an upper surface, a lower surface, and an avoiding section arranged to pass through the upper surface and the lower surface.*

*27. The crib of claim 26, wherein the folding component includes an annular structure and a resilient structure, the avoiding section being enclosed by the annular structure, the annular structure including an opening communicated to the avoiding section, and the resilient structure being disposed in the opening and being configured to enlarge or shrink the avoiding section.*

*28. The crib of claim 26, wherein the avoiding section is concave and is disposed laterally on the folding component.*

*29. The crib of claim 25, wherein the folding component is fixed to the bottom portion of the hammock.*

*30. The crib of claim 25, wherein the folding component is disposed on a central portion of the hammock, the plurality of supporting components being arranged radially around the folding component when the hammock and the bedstead are unfolded.*

*31. The crib of claim 18, wherein the plurality of supporting components are arranged to pivot relative to each other to permit the hammock and the bedstead to fold and unfold together.*

*32. The crib of claim 18, wherein the bottom portion is arranged to be a bed bottom, and the side portion is arranged to be a bed bumper.*

*33. The crib of claim 18, further comprising:*

*a folding mechanism arranged to operate in conjunction with the movement of the supporting components to fold and unfold the bedstead while the hammock remains coupled to the bedstead.*

*34. The crib of claim 33, wherein the bedstead is configured to be folded upward to pivot the supporting components downward so as to fold the hammock together with the bedstead.*

*35. The crib of claim 18, further comprising:*

*a folding component disposed on a central position of the hammock;*

*a folding mechanism disposed on a bottom of the bedstead; and*

*a mattress disposed on the hammock,*

*wherein the plurality of supporting components are disposed on the hammock and are arranged to support the mattress,*

*wherein the folding component includes an upper surface, a lower surface, and an avoiding section arranged to pass through the upper surface and the lower surface, the folding component being disposed on a central portion of the hammock, and*

*wherein the plurality of supporting components are disposed around the folding component.*

*36. The crib of claim 18, further comprising:*

*a folding component connected to each of the plurality of supporting components; and*

*a mattress,*

*wherein the folding component is disposed on a central portion of the hammock, the folding component including an upper surface, a lower surface, and an avoiding section arranged to pass through the upper surface and the lower surface, a through hole formed on the hammock being arranged to permit access through the avoiding section and being sized to permit manual operation of the folding component therethrough, and*

*wherein the plurality of supporting components are disposed around the folding component and arranged to support the mattress.*

*37. A crib comprising:*

*a bedstead;*

*a hammock including a bed bottom and a bed bumper, the bed bumper being arranged to connect to the bedstead; and*

*a plurality of tubes disposed near the bed bottom, each tube having a first end arranged to be adjacent to a first end of one or more other tubes and a second end fixed to an edge position of the bed bottom,*

*wherein the tubes are configured in a first position when the hammock is folded and a second position when the hammock is unfolded, without removing the hammock from the crib.*

*38. The crib of claim 37, wherein the first end of each tube remains adjacent to the first end of the one or more other tubes while the hammock and the bedstead are folded and unfolded together.*

*39. The crib of claim 37, wherein the tubes are arranged to pivot relative to each other to permit the hammock and the bedstead to fold and unfold together.*

*40. The crib of claim 37, wherein the first ends of the tubes are arranged to be at a first position near a central position of the bed bottom when the hammock and the bedstead are unfolded, the first ends of the tubes remaining at the first position while the hammock and the bedstead are being folded.*

*41. A crib comprising:*

*a bedstead;*

*a hammock including a bed bottom having a peripheral edge and a bed bumper having an upper edge and a lower edge, the bed bumper being arranged to be coupled to the peripheral edge of the bed bottom at the lower edge and to be coupled to the bedstead at the upper edge; and*

*a plurality of supporting components positioned near the bed bottom, each supporting component having a first end being movable relative to one or more other supporting components and a second end fixedly coupled to the bed bottom near the peripheral edge of the bed bottom,*

*wherein the supporting components are configured in a first position when the hammock is folded and a second position when the hammock is unfolded, without removing the hammock from the crib.*

*42. A supporting mechanism for folding and unfolding a hammock with a foldable crib, the supporting mechanism comprising:*

*a plurality of supporting components, each wherein at least one supporting components having a first end being movable relative to one or more other supporting components and a second end arranged to be fixed to the hammock,*

*wherein the plurality of supporting components are configured in a first position when the hammock is folded and a second position when the hammock is unfolded, without removing the hammock from the crib, and a through hole is formed on the hammock.*

*43. The supporting mechanism of claim 42, wherein each of the supporting components includes a retracting structure, the retracting structure being arranged to stretch to cause the hammock to unfold and to retract to cause the hammock to fold.*

*44. The supporting mechanism of claim 42, wherein at least one of the supporting components includes a first supporting portion and a second supporting portion, a first end of the first supporting portion being arranged to be slidably inserted into a first end of the second supporting*

*portion, a second end of the first supporting portion being movable relative to a second end of the first supporting portion of another supporting component, and a second end of the second supporting portion being fixed to the hammock.*

*45. The supporting mechanism of claim 42, further comprising a folding component connected to one or more of the first ends of the plurality of supporting components,*

*wherein the folding component includes a base having a through hole disposed on a central portion of the base.*

*46. The supporting mechanism of claim 45, wherein the folding component includes an annular structure and a resilient structure, the through hole being enclosed by the annular structure, the annular structure including an opening communicated to the through hole, and the resilient structure being disposed in the opening and being configured to enlarge or shrink the through hole.*

*47. The supporting mechanism of claim 45, wherein the plurality of supporting components are configured to be pivoted downward relative to the folding component thereby enabling the hammock and the crib to be folded together.*

*48. The supporting mechanism of claim 42, further comprising a folding component,*

*wherein the folding component includes an upper surface, a lower surface, and an avoiding section arranged to pass through the upper surface and the lower surface, the folding component being configured to be disposed on a central portion of the hammock, the avoiding section being disposed at a location corresponding to a through hole formed on the hammock and being sized to permit manual operation of the folding component therethrough, and*

*wherein the plurality of supporting components are disposed around the folding component and arranged to support a mattress, the second end of each of the supporting components being configured to be fixed to the hammock on an edge portion of the hammock.*

*49. A supporting mechanism for folding and unfolding the hammock with a foldable crib, the supporting mechanism comprising:*

*a plurality of tubes, each tube having a first end arranged to be adjacent to a first end of one or more other tubes and a second end fixedly coupled to the hammock;*

*wherein the tubes are configured in a first position when the hammock is folded and a second position when the hammock is unfolded, without removing the hammock from the crib, and a through hole is formed on the hammock.*

*50. The supporting mechanism of claim 49, wherein the tubes are arranged to pivot relative to each other to permit the hammock and the crib to fold and unfold together.*

*51. A supporting mechanism of a hammock for folding and unfolding the hammock with a foldable crib, the supporting mechanism comprising:*

*a plurality of supporting components, each supporting component having a first end arranged to be movable relative to one or more other supporting components and a second end arranged to be fixedly coupled to the hammock;*

*wherein the plurality of supporting components are configured in a first position when the hammock is folded and a second position when the hammock is unfolded, without removing the hammock from the crib, and a through hole is formed on the hammock.*

*52. A hammock for use with a foldable crib, comprising:*

*a bed bottom;*

*a bed bumper having an upper edge for attaching to the crib and a lower edge connected to at least one edge of the bed bottom; and*

*a supporting mechanism including a plurality of supporting components, wherein at least one supporting component having a first end being movable relative to one or more other supporting components and a second end arranged to be fixed to the bed bottom,*

*wherein the supporting components are configured in a first position when the hammock is folded and a second position when the hammock is unfolded, without removing the hammock from the crib, and a through hole is formed on the hammock.*

*53. The hammock of claim 52, wherein the plurality of supporting components are arranged radially around a central position of the bed bottom.*

*54. The hammock of claim 52, wherein the supporting mechanism further comprises a folding component connected to the first ends of the plurality of supporting components,*

*wherein the supporting mechanism is disposed near the bed bottom and is arranged to support a mattress,*

*wherein the folding component includes an upper surface, a lower surface, and an avoiding section arranged to pass through the upper surface and the lower surface, the folding component being disposed near a central portion of the bed bottom, and*

*wherein the plurality of supporting components are disposed around the folding component and arranged to support the mattress, the second end of each of the supporting components being fixed to the bed bottom at an edge portion of the bed bottom.*

*55. The hammock of claim 52, wherein the supporting mechanism further comprises a folding component connected to the first ends of the plurality of supporting components,*

*wherein the folding component is disposed near a central portion of the bed bottom, the folding component including an upper surface, a lower surface, and an avoiding section arranged to pass through the upper surface and the lower surface, a through hole formed on the bed bottom being arranged to permit access through the avoiding section and being sized to permit manual operation of the folding component therethrough, and*

*wherein the plurality of supporting components are disposed around the folding component and arranged to support a mattress, the second end of each of the supporting components being fixed to the bed bottom at an edge portion of the bed bottom.*

*56. A hammock for attaching to a foldable crib, comprising:*

*a bed bottom;*

*a bed bumper having an upper edge for attaching to the crib and a lower edge connected to at least one edge of the bed bottom; and*

*a plurality of tubes arranged near the bed bottom, each tube having a first end arranged to be adjacent to a first end of one or more other tubes and a second end fixedly coupled to the bed bottom;*

*wherein the tubes are configured in a first position when the hammock is folded and a second position when the hammock is unfolded, without removing the hammock from the crib, and a through hole is formed on the hammock.*

*57. A hammock for attaching to a foldable bedstead, comprising:*

*a bottom portion having a peripheral edge;*

*a side portion coupled to the peripheral edge of the bottom portion, the side portion being arranged to be detachably coupled to the bedstead; and*

*a plurality of supporting components positioned near the bottom portion, each supporting component having a first end being movable relative to one or more other supporting components and a second end fixedly coupled to the bottom portion near the peripheral edge of the bottom portion,*

*wherein the supporting components are configured in a first position when the hammock and bedstead are folded and a second position when the hammock and bedstead are unfolded, without removing the hammock from the crib, and a through hole is formed on the hammock.*

* * * * *